US011813777B1

(12) United States Patent
Shang et al.

(10) Patent No.: US 11,813,777 B1
(45) Date of Patent: Nov. 14, 2023

(54) KIND OF FOAM MOLD DESIGN FOR CONCAVE SEAT

(71) Applicant: LEAR CORPORATION, Southfield, MI (US)

(72) Inventors: Baolong Shang, Shanghai (CN); Asad Ali, Troy, MI (US); Todd W. Waelde, Livonia, MI (US); Hongwei Xia, Shanghai (CN); Chandrashekar Simha, Shanghai (CN); Jiangang Zhang, Shanghai (CN); Yue Wang, Shanghai (CN)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/854,315

(22) Filed: Jun. 30, 2022

(51) Int. Cl.
| | | |
|---|---|---|
| *B29C 33/16* | (2006.01) | |
| *B29C 44/12* | (2006.01) | |
| *B60N 2/58* | (2006.01) | |

(52) U.S. Cl.
CPC .......... *B29C 33/16* (2013.01); *B29C 44/1261* (2013.01); *B60N 2/5833* (2013.01); *B60N 2/5891* (2013.01); *Y10T 428/24017* (2015.01)

(58) Field of Classification Search
None
See application file for complete search history.

(56) References Cited

U.S. PATENT DOCUMENTS

| | | |
|---|---|---|
| 2005/0017407 A1 | 1/2005 | Graham et al. |
| 2012/0286445 A1 | 11/2012 | Ohta |
| 2021/0339664 A1 | 11/2021 | Voigt et al. |

FOREIGN PATENT DOCUMENTS

WO  WO-2021116991 A1 * 6/2021 ............. B23Q 3/066

* cited by examiner

*Primary Examiner* — Alexander S Thomas
(74) *Attorney, Agent, or Firm* — Brooks Kushman P.C.

(57) ABSTRACT

A mold component for forming a foamed part with a three-dimensional shape includes a magnetic block having a first face that defines a curved three-dimensional surface with a hook strip-receiving recess positioned above the magnetic block. The magnetic block is configured to be placed in a mold with a hook strip placed in the hook strip-receiving recess. The hook strip has a ferrous metal-containing component such that the magnetic block attracts and holds the hook strip with the hook strip conforming to the curved three-dimensional surface. Characteristically, the mold component is configured to be applied in a molding process to mold the three-dimensional shape in the foamed part wherein the hook strip attaches to a trim cover.

24 Claims, 5 Drawing Sheets

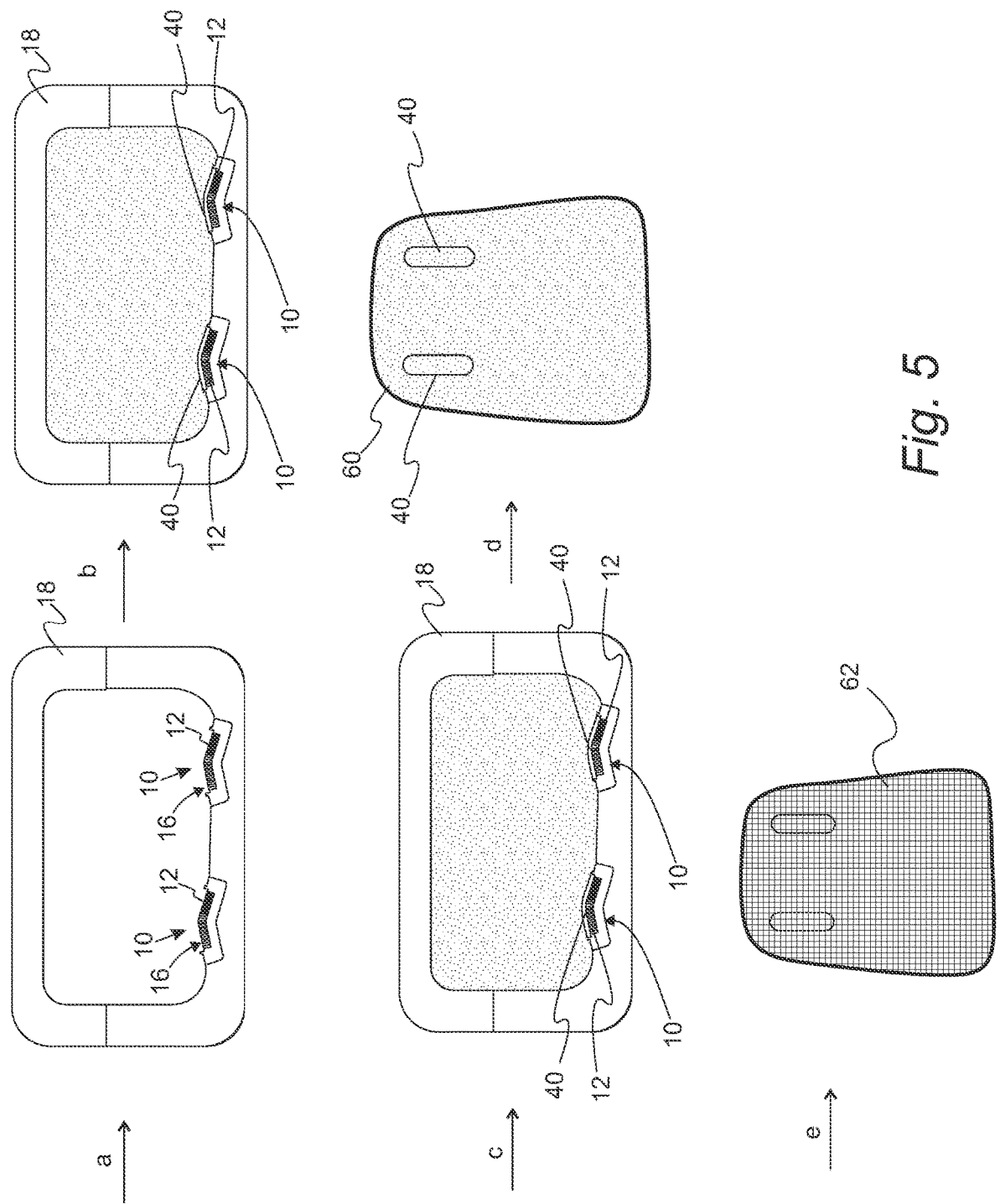

KIND OF FOAM MOLD DESIGN FOR CONCAVE SEAT

BRIEF DESCRIPTION OF THE DRAWINGS

For a further understanding of the nature, objects, and advantages of the present disclosure, reference should be made to the following detailed description, read in conjunction with the following drawings, wherein like reference numerals denote like elements and wherein:

FIG. 5. Schematic flow chart showing the fabrication of a vehicle seat using the mold component having magnets for holding a hook strip during molding.

DETAILED DESCRIPTION

Figure 1A:
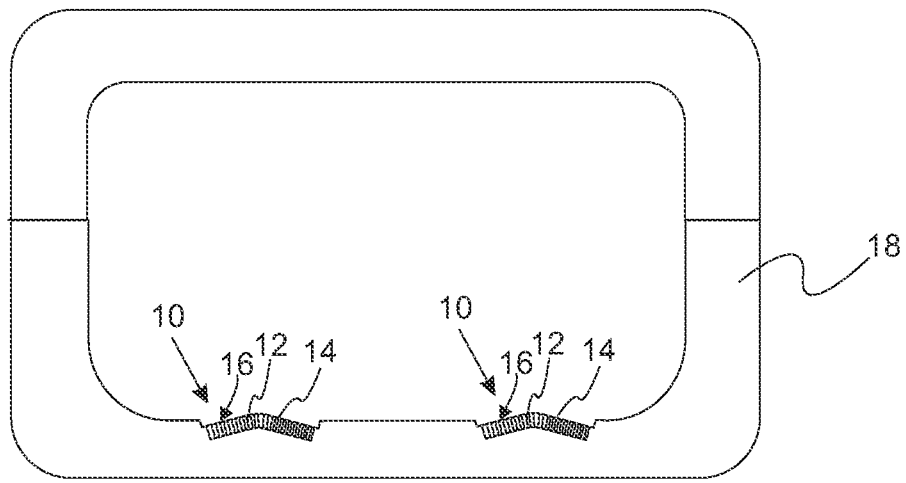
FIG. 1A. Schematic cross-section of a mold chamber with a magnetic hook strip holder integral the chamber wall.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: when a given chemical structure includes a substituent on a chemical moiety (e.g., on an aryl, alkyl, etc.) that substituent is imputed to a more general chemical structure encompassing the given structure; percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value.

As used herein, the term "and/or" means that either ail or only one of the elements of said group may be present. For example, "A and/or B" shall mean "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The phrase "composed of" means "including" or "consisting of." Typically, this phrase is used to denote that an object is formed from a material.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" and "multiple" as a subset. In a refinement, "one or more" includes "two or more."

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

When referring to a numeral quantity, in a refinement, the term "less than" includes a lower non-included limit that is 5 percent of the number indicated after "less than." For example, "less than 20" includes a lower non-included limit of 1 in a refinement. Therefore, this refinement of "less than 20" includes a range between 1 and 20. In another refinement, the term "less than" includes a lower non-included limit that is, in increasing order of preference, 20 percent, 10 percent, 5 percent, or 1 percent of the number indicated after "less than."

Figure 1B:
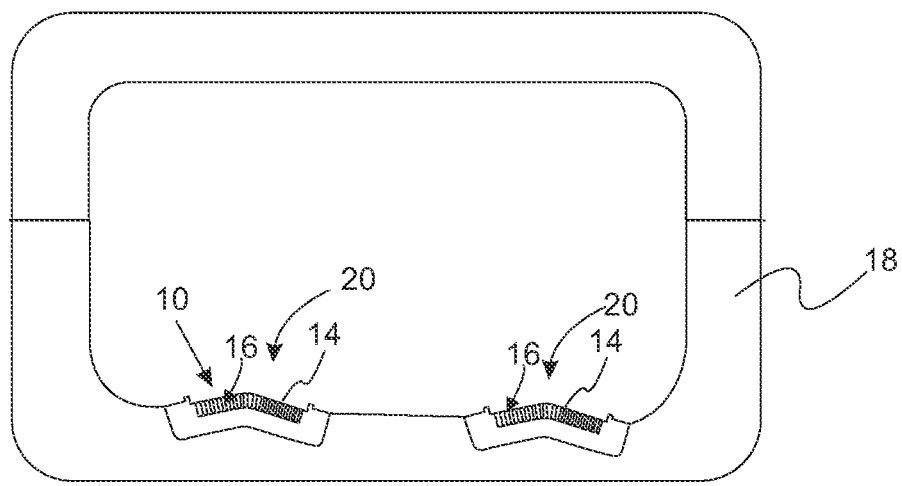
FIG. 1B. Schematic cross-section of a mold chamber with a magnetic hook strip holder contained in a mold insert that is attached to the chamber wall.

Referring to FIGS. 1A and 1B, schematics of a component for forming a foamed part with a three-dimensional shape are provided. Mold component 10 includes a magnetic block 12. Magnetic block 12 includes a first face 14 that defines a curved three-dimensional surface. Magnetic block 12 also at least partially defines a hook strip-receiving recess 16. Therefore, the hook strip-receiving recess 16 is positioned above the magnetic block. In this context, a hook strip-receiving recess is a recess into which a hook strip or other attachment strip can be placed, In a refinement, the magnetic block 12 includes a plurality of permanent magnets sized to define the curved three-dimensional surface. The magnetic block 12 is configured to be placed in a mold 18 with a hook strip placed in the hook strip-receiving recess 16. In a refinement, the three-dimensional shape is a concave shape. In another refinement, the three-dimensional shape is a convex shape. The magnetic block can be attached to a mold surface magnetically or by an adhesive or screws. In a refinement, the plurality of magnets has a thickness from about 5 to 25 mm. In a further refinement, the plurality of magnets has a thickness from about 10 to 20 mm and typically about 15 mm.

FIG. 1A depicts a variation in which magnetic block 12 is a molding chamber section that is integrated into the wall of mold 18.

Figure 2A:
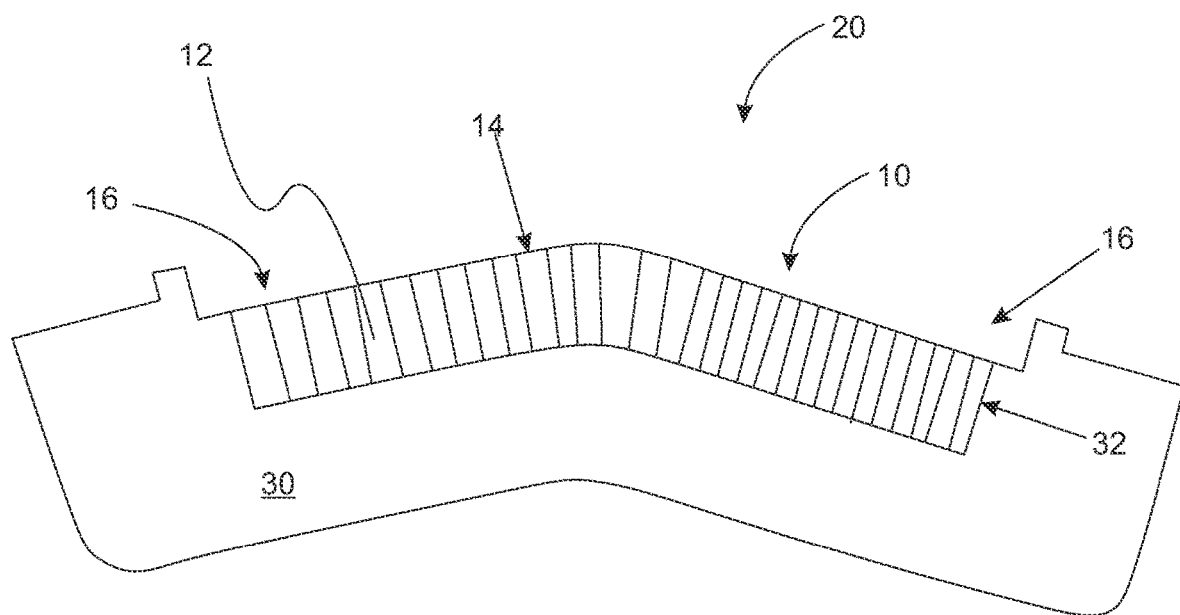
FIG. 2A. Schematic cross-section of a mold insert having magnet for holding a hook strip.
Figure 2B:
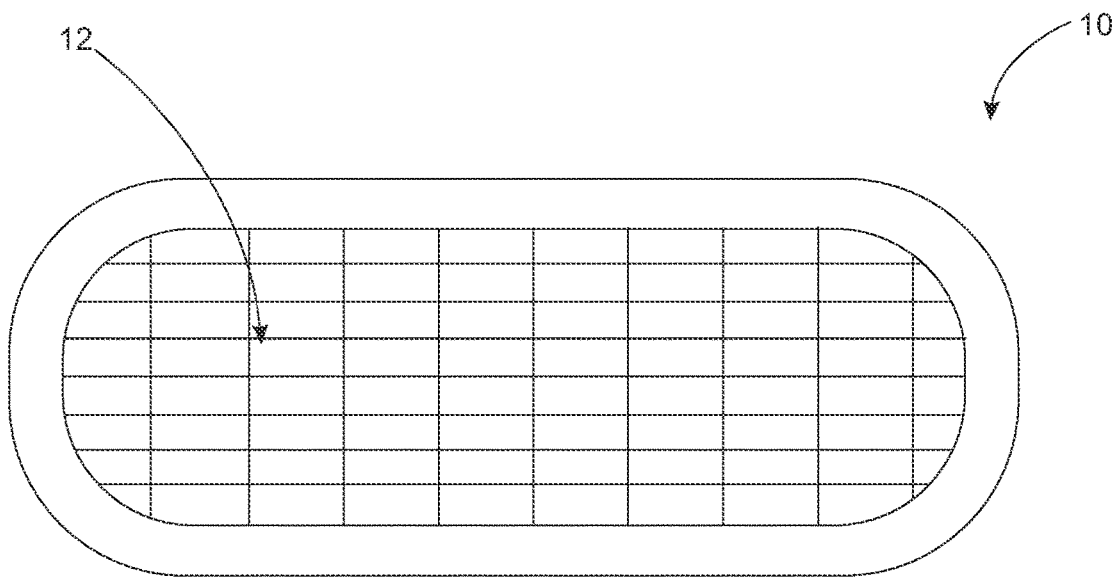
FIG. 2B. Schematic top view of a mold insert having magnet for holding a hook strip.

FIGS. 1B, 2A, and 2B depict a variation in which magnetic block 12 is part of a mold insert 20 that is positioned in mold 18. In this variation, a metallic block 30 (e.g., stainless steel) defines a magnetic block receiving recess 32. Magnetic block 12 is positioned in the magnetic block receiving recess 32. As set forth above, the magnetic block 12 has a first face 14 that defines a curved three-dimensional surface. Magnetic block 12 partially fills the magnetic block receiving recess 32 such that a hook strip-receiving recess 16 over the magnetic block remains for receiving a hook strip having a ferrous metal-containing component.

Figure 3:
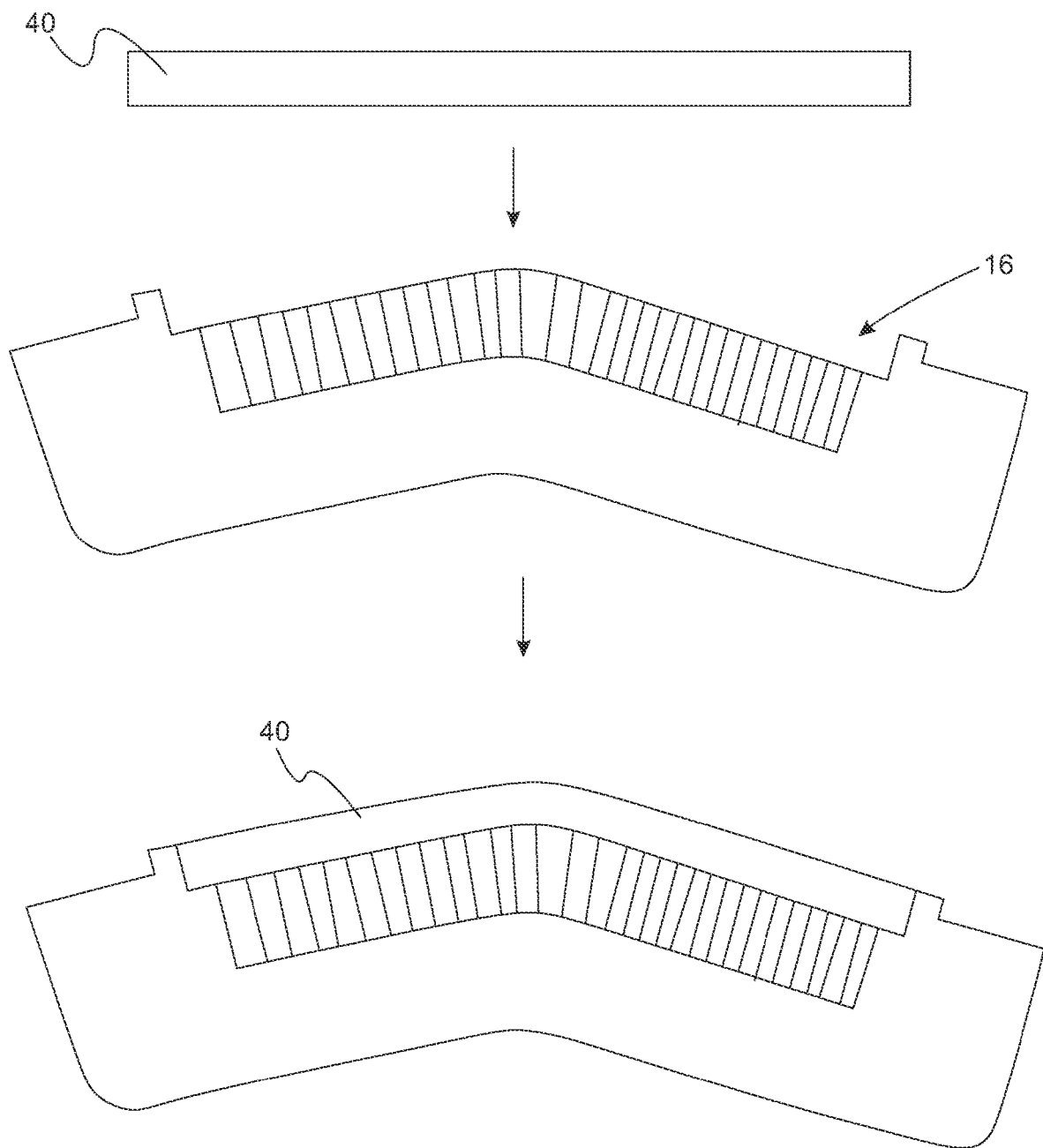
FIG. 3. Schematic flow chart showing the attachment of a hook strip to the mold insert of FIGS. 2A and 2B.

Referring to FIG. 3, a schematic flow chart showing the placement of a hook strip is provided. Hook strip 40 is positioned in recess 16. Advantageously, hook strip 40 has a ferrous metal-containing component such that the magnetic block 12 attracts and holds the hook strip imparting the three-dimensional shape thereto. Mold component 10 is configured to be applied in a molding process to mold the three-dimensional shape in the foamed part wherein the hook strip attaches to a trim cover.

Figure 4A:
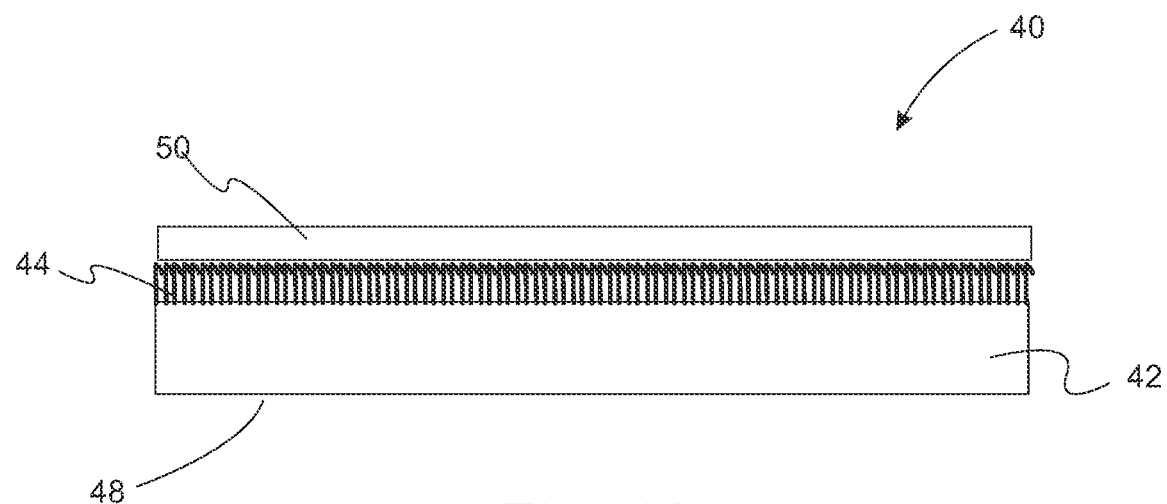
FIG. 4A. Schematic cross-section of a hook strip.
Figure 4B:
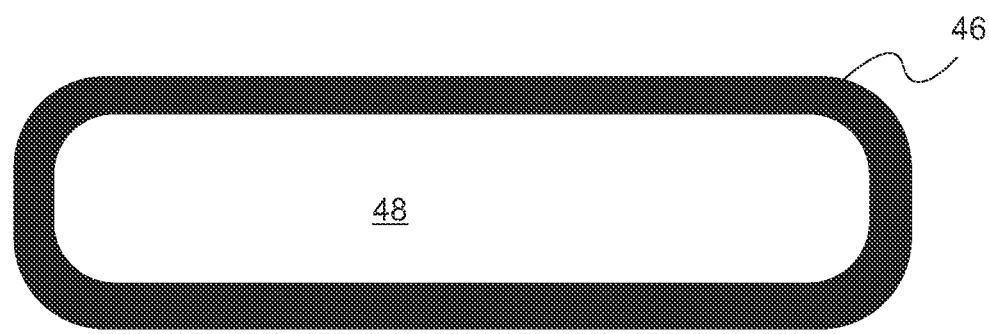
FIG. 4B. Schematic bottom view of a hook strip.

Referring to FIGS. 4A and 4B, schematics of a hook strip are provided. Hook strip 40 includes a backing layer 42 and a hook layer 44 disposed over the backing layer. In a refinement, ferrous metal-containing layer 46 is disposed over the bottom face 48 of backing layer 42. Typically, the ferrous metal-containing layer is formed from a metal-containing slurry. In another refinement, the hook strip 40 further includes a peelable protective layer 50 disposed over the hook layer. In a further refinement, peelable protective layer 50 includes a ferrous metal.

Referring to FIG. 5, a schematic flow chart depicting a method for forming a foamed part 60 with a three-dimensional shape is provided. In step a), a molding chamber 18 having a mold component 10 as described above is provided. Mold component 10 includes a magnetic block 12 having a first face that defines a curved three-dimensional surface with a hook strip-receiving recess 16 positioned above the magnetic block. In step b), a hook strip 40 in the hook strip-receiving recess. The hook strip 40 has a ferrous metal-containing component such that the magnetic block attracts and holds the hook strip imparting the three-dimensional shape thereto. In step c), foam precursors are reacted in the molding chamber to form the foamed part. For a polyurethane foam, the foam precursors are an isocyanate and a polyol In step d), foamed part 60 is removed from the molding chamber. The protective layer 50 (see, FIG. 4A) is then removed from the hook strip 40. In step e), a trim cover 62 is attached to the foamed part wherein the hook strip is attached to a mating region in the trim cover having loops.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A mold component comprising:
  a magnetic block comprising a first face, the first face defining a curved three-dimensional surface and partially defining a hook strip-receiving recess, wherein:
  the magnetic block is configured to be placed in a mold with a hook strip placed in the hook strip-receiving recess,
  the hook strip comprises a ferrous metal-containing component such that the magnetic block attracts and holds the hook strip, the hook strip conforming to the curved three-dimensional surface, and
  the mold component is configured to be applied in a molding process to mold a three-dimensional shape in a foamed part, wherein the magnetic block includes a plurality of permanent magnets sized to define the curved three-dimensional surface.

2. The mold component of claim 1 wherein the mold component is a mold insert.

3. The mold component of claim 1 wherein the mold component is a molding chamber section.

4. The mold component of claim 1 wherein the three-dimensional shape is a concave shape.

5. The mold component of claim 1, wherein the hook strip includes a backing layer and a hook layer disposed over the backing layer.

6. The mold component of claim 5, wherein a ferrous metal-containing layer is disposed over the backing layer.

7. The mold component of claim 6, wherein the ferrous metal-containing layer is formed from a metal-containing slurry.

8. The mold component of claim 5, wherein the hook strip further comprises a peelable protective layer disposed over the hook layer.

9. The mold component of claim 8, wherein the peelable protective layer includes a ferrous metal.

10. A mold insert for forming a foamed part with a three-dimensional shape, the mold insert comprising:
   a metallic block, the metallic block defining a receiving recess; and
   a magnetic block positioned in the receiving recess, the magnetic block comprising a first face, the first face defining a curved three-dimensional surface, wherein
   the magnetic block partially fills the receiving recess such that a hook strip-receiving recess remains and is at least partially defined by the first face,
   the hook strip-receiving recess is configured to receive a hook strip comprising a ferrous metal-containing component such that the magnetic block attracts and holds the hook strip conforming to the curved three-dimensional surface, and
   the mold insert is configured to be applied in a molding process to mold the three-dimensional shape, wherein the three-dimensional shape is a concave shape.

11. The mold insert of claim 10, wherein the hook strip includes a backing layer and a hook layer disposed over the backing layer.

12. The mold insert of claim 11, wherein a ferrous metal-containing layer is disposed over the backing layer.

13. The mold insert of claim 12, wherein the ferrous metal-containing layer is formed from a metal-containing slurry.

14. The mold insert of claim 11, wherein the hook strip further includes a peelable protective layer disposed over the hook layer.

15. The mold insert of claim 14, wherein the peelable protective layer includes a ferrous metal.

16. A mold component comprising:
   a magnetic block comprising a first face, the first face defining a curved three-dimensional surface and partially defining a hook strip-receiving recess, wherein:
   the magnetic block is configured to be placed in a mold with a hook strip placed in the hook strip-receiving recess,
   the hook strip comprises a ferrous metal-containing component such that the magnetic block attracts and holds the hook strip, the hook strip conforming to the curved three-dimensional surface, and
   the mold component is configured to be applied in a molding process to mold a three-dimensional shape in a foamed part, wherein the three-dimensional shape is a concave shape.

17. The mold component of claim 16 wherein the mold component is a mold insert.

18. The mold component of claim 16 wherein the mold component is a molding chamber section.

19. The mold component of claim 16, wherein the hook strip includes a backing layer and a hook layer disposed over the backing layer.

20. The mold component of claim 19, wherein a ferrous metal-containing layer is disposed over the backing layer.

21. The mold component of claim 20, wherein the ferrous metal-containing layer is formed from a metal-containing slurry.

22. The mold component of claim 19, wherein the hook strip further comprises a peelable protective layer disposed over the hook layer.

23. The mold component of claim 22, wherein the peelable protective layer includes a ferrous metal.

24. The mold component of claim 16, wherein the magnetic block includes a plurality of permanent magnets sized to define the curved three-dimensional surface.

* * * * *